United States Patent [19]

Handel et al.

[11] Patent Number: 5,071,666
[45] Date of Patent: Dec. 10, 1991

[54] SYSTEM FOR INJECTING BRINE AND THE LIKE INTO MEAT ITEMS

[75] Inventors: Gary A. Handel, Madison; Timothy G. Mally, Oregon; Larry G. McManis, Jr., Madison, all of Wis.

[73] Assignee: Oscar Mayer Foods Corporation, Madison, Wis.

[21] Appl. No.: 625,735

[22] Filed: Dec. 11, 1990

[51] Int. Cl.[5] .................. A23C 9/00; A23C 17/00; A23L 1/31; A23L 3/34
[52] U.S. Cl. .................. 426/281; 99/487; 99/533; 99/535; 426/652
[58] Field of Search .......... 99/486, 487, 494, 516, 99/532, 533, 535; 426/281, 58, 231, 264, 332, 652

[56] References Cited

U.S. PATENT DOCUMENTS

| | | | |
|---|---|---|---|
| 3,347,679 | 10/1967 | Nordin. | |
| 3,656,424 | 4/1972 | Evanson | 99/487 |
| 3,675,567 | 7/1972 | Rejsa et al. | 99/533 |
| 3,863,556 | 2/1975 | Townsend | 99/487 |
| 4,142,000 | 2/1979 | Townsend | 426/281 |
| 4,220,669 | 9/1980 | Townsend | 426/281 |
| 4,254,151 | 3/1981 | Townsend | 426/231 |
| 4,286,510 | 9/1981 | Prosenbauer | 99/533 |
| 4,292,889 | 10/1981 | Townsend | 99/535 |
| 4,455,928 | 6/1984 | Townsend | 99/533 |
| 4,487,119 | 12/1984 | Townsend | 99/487 |
| 4,903,590 | 2/1990 | Muller et al. | 99/487 |

Primary Examiner—Timothy F. Simone
Attorney, Agent, or Firm—Lockwood, Alex, Fitzgibbon & Cummings

[57] ABSTRACT

An apparatus and method are provided for injecting bacon bellies or the like with a brine solution or other treatment fluid. A parameter of the belly or the like to be injected is determined at a location upstream of the injection site. This parameter is used to vary the amount of brine or the like which is injected into the belly or the like. By this approach, the quantity of fluid injected is tailored to the particular belly being injected, which achieves an improvement in the extent that bellies being processed deviate from a target fluid pickup value.

25 Claims, 7 Drawing Sheets

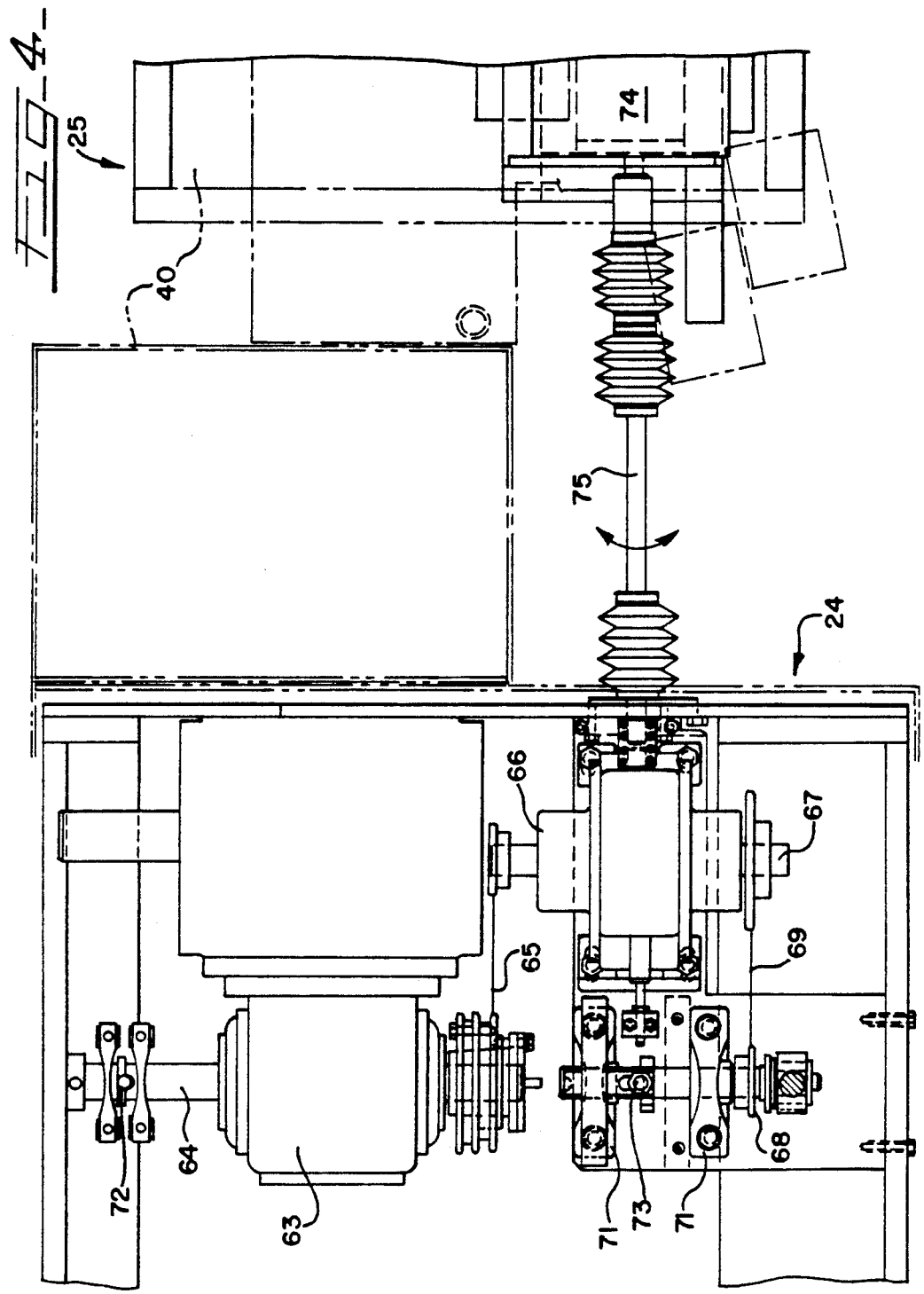

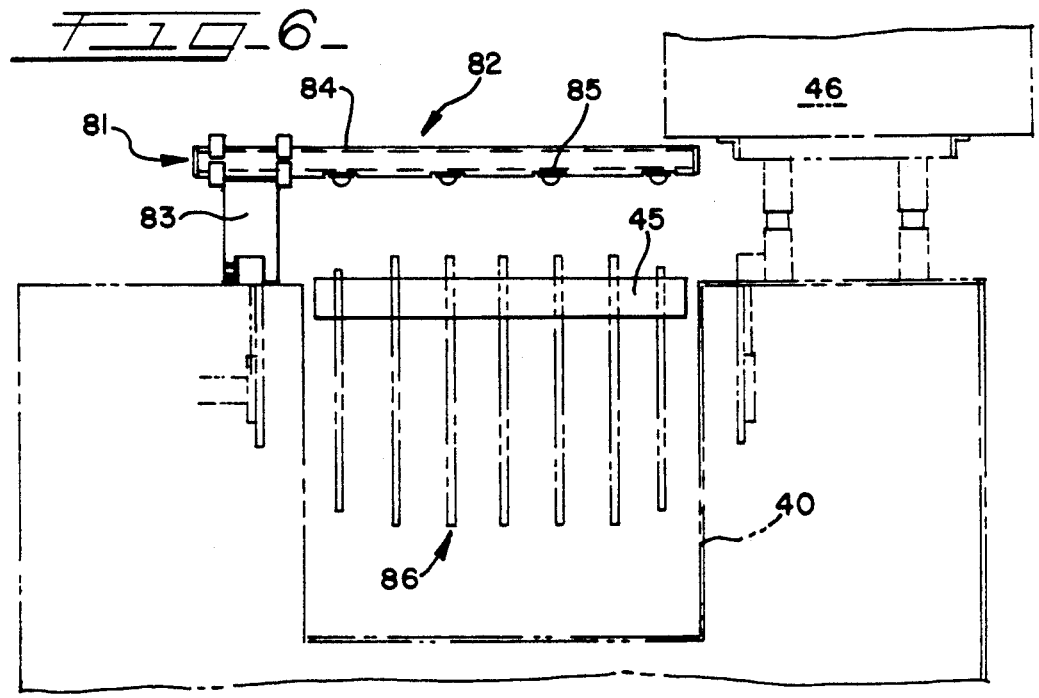
FIG_6_
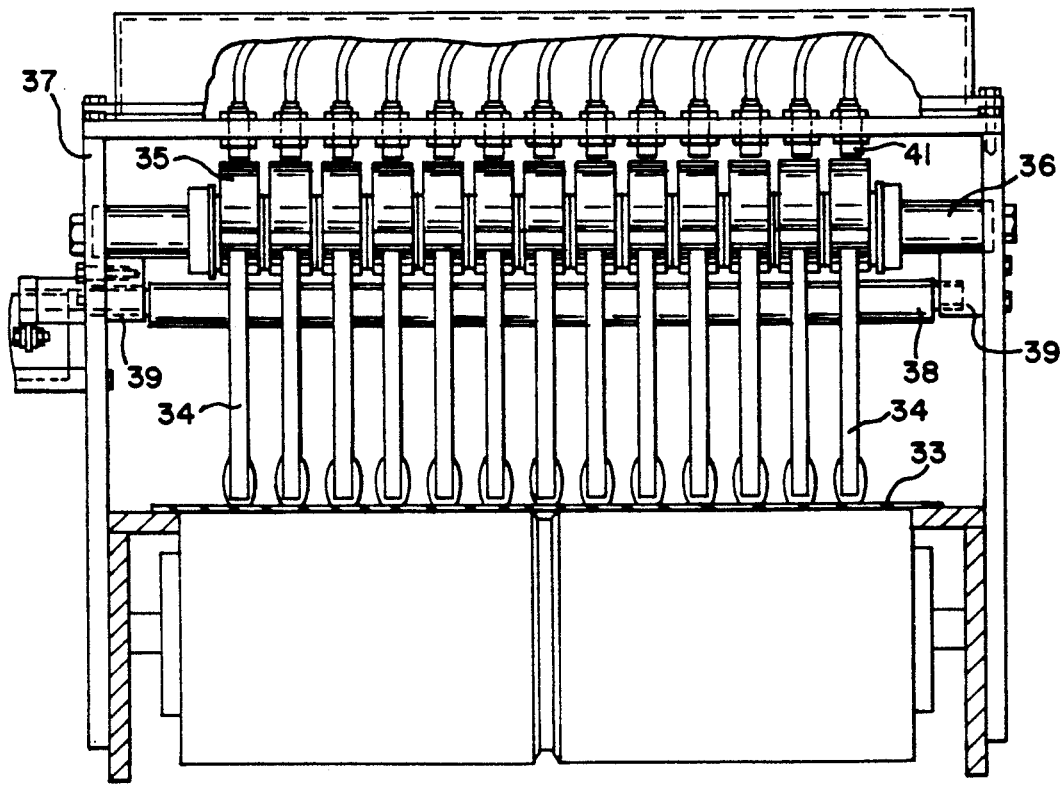
FIG_8_

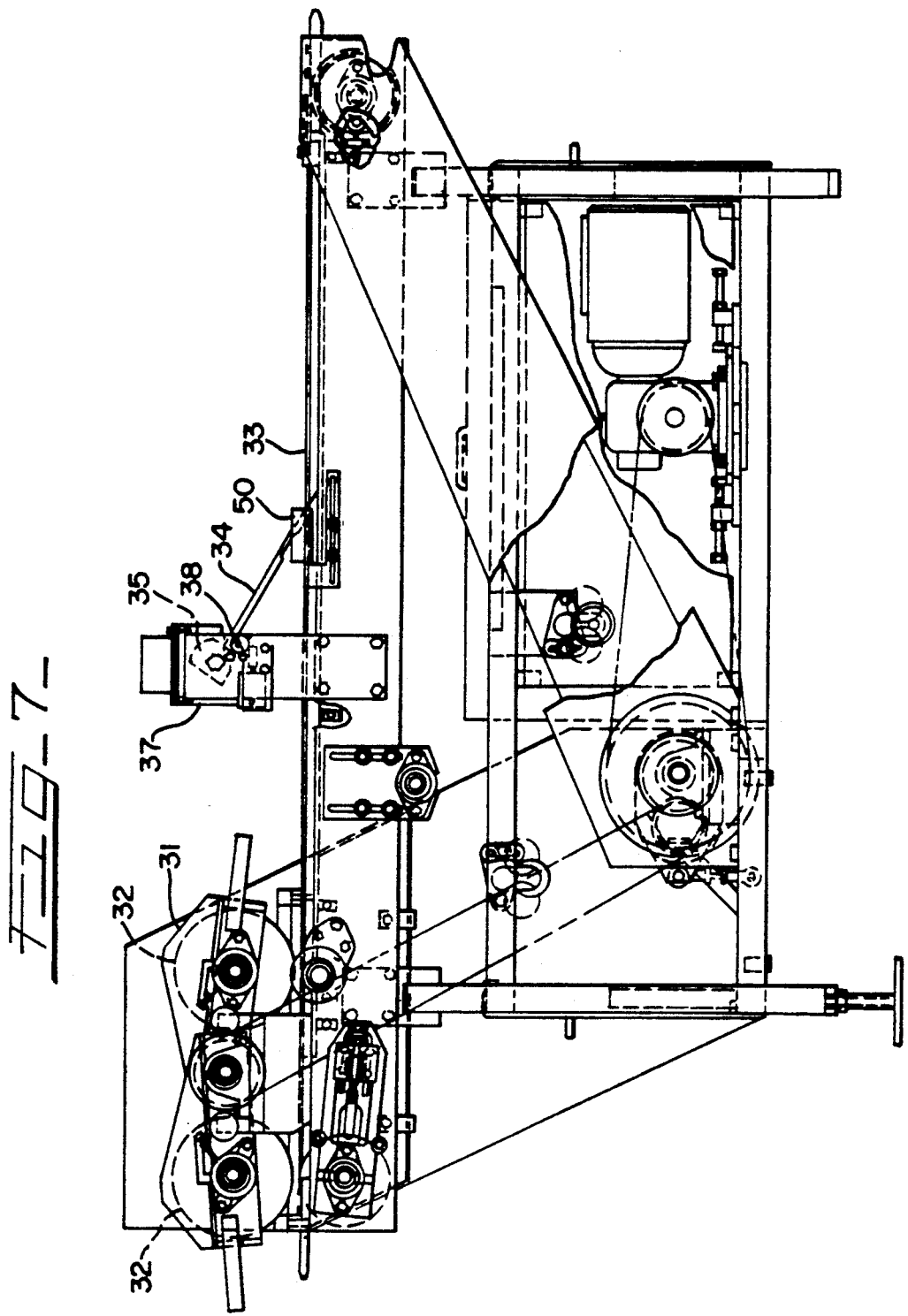

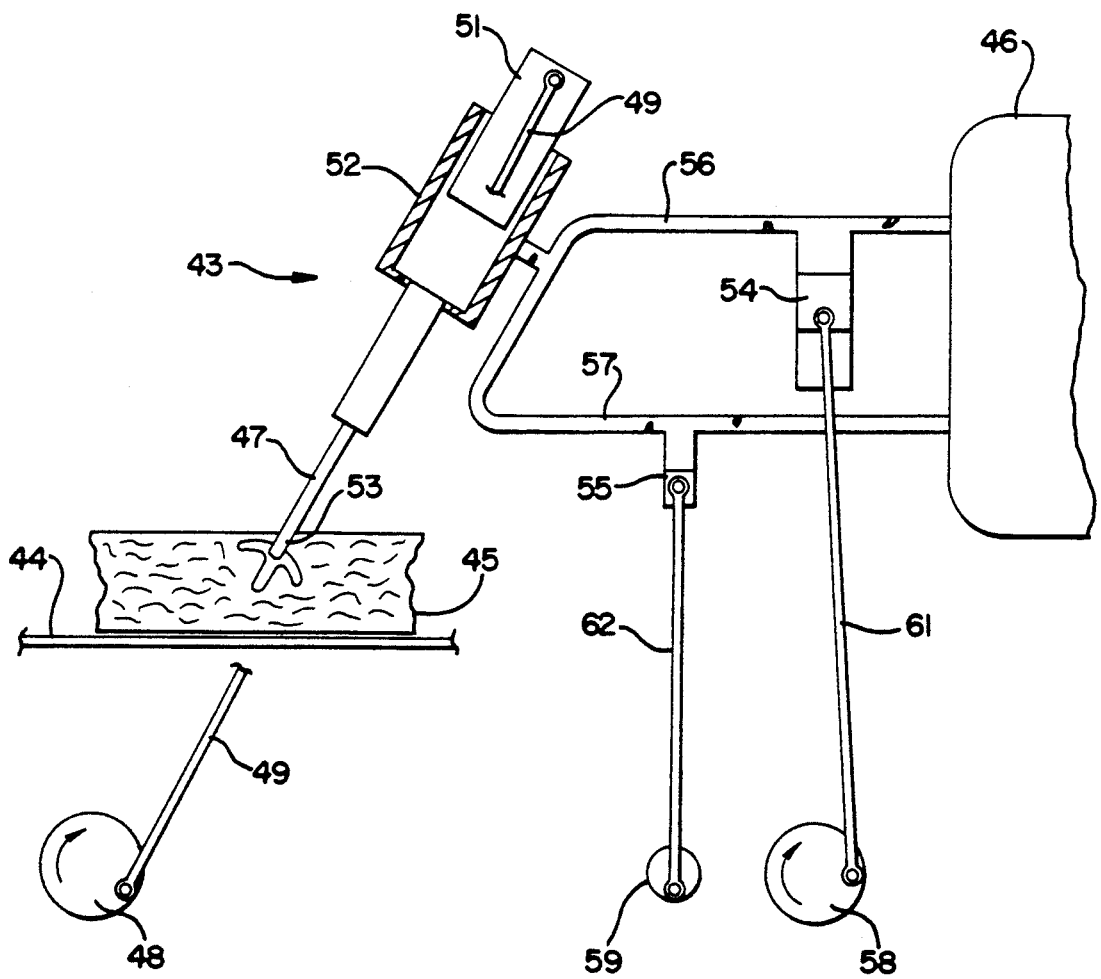

SYSTEM FOR INJECTING BRINE AND THE LIKE INTO MEAT ITEMS

DESCRIPTION

BACKGROUND AND DESCRIPTION OF THE INVENTION

The present invention generally relates to an apparatus and method for automatically injecting brine and the like into meat items such as bacon bellies. More particularly, the invention relates to an apparatus and method for injecting a substantially continuous flow of meat items by a system including an arrangement whereby fluid ejected by injector members is automatically varied according to at least one parameter of each individual belly or the like so as to tailor the amount injected into each particular belly or the like. This injection tailoring minimizes variation in the percentage of fluid picked up from belly to belly during the injection procedure. A dimension grader assembly preferably is provided upstream of the injection assembly to determine, for each individual belly or the like, the value of the parameter which is utilized in order to tailor the injection scheme for each one of the bellies or the like flowing to and through the injector.

During the course of treating products in food processing operations or the like, it is at times required to inject each food item with a fluid. A well-known example in this regard is the injection of bacon bellies with pickling brine. In many instances of injection of fluids into meat items and the like, it is important to avoid either over-injection or under-injection. In the case of brine injection, if too much brine is injected, the result can be a bacon product having an excessively salty taste or having a level of nitrites in excess of desirable or regulated amounts. Having too little brine injected can lead to a bacon product having an off-taste which can be too bland or otherwise unacceptable. The extent of brine injection can also vary texture, cure and color. Product uniformity from the point of view of taste, texture, cure and color can be enhanced by increasing injection uniformity throughout the bacon belly or the like and from one bacon belly to another, regardless of thickness or the like.

Another important aspect of fluid injection into meat products and the like is the need to stay within government standards. For example, in the case of bacon bellies, certain USDA standards must be complied with. One of these is that, when a fluid is injected, particularly one containing large quantities of water such as a brine solution, the amount of injected fluid or water cannot remain in the finished product and still meet a particular standard of identity. For example, in the case of bacon, the weight of brine solution injected into the belly must be driven off during processing so that the final bacon product cannot be said to contain any added water. Because of this, bacon producers will typically avoid adding brine in weight percentages which approach too closely the percentage of weight that is driven off during processing of the raw or green belly into the finished bacon product. Because of this, in a typical bacon processing plant, the weight of raw bellies entering the plant is noticeably greater than the weight of finished product exiting the line. Substantial savings in raw material cost and efficiency could be achieved if the difference between raw belly weights and finished product weights could be reduced.

With more particular reference to this objective, the term "pickup" can be used to define the amount of brine which is added during belly injection. The pickup will be detected as added weight to each raw belly. During subsequent processing, such as belly handling, cooking, smoking, pressing, slicing and the like, this pickup will be depleted. Ideally, only the pickup weight will be removed during processing, thereby leaving exactly the same belly weight as the raw belly.

Bellies, however, are not particularly uniform. Bacon bellies come off the cut operation in many sizes and weights and thicknesses. Sometimes attempts at uniformity include some pre-sorting of bellies according to selected weight ranges, such as 7 to 9 pounds, 9 to 11 pounds and 11 to 13 pounds. Even this type of weight sorting does not typically account for bellies that weigh the same but have different size parameters, such as height.

These types of variations make it exceedingly difficult to consistently inject the same percentage pickup from belly to belly. Because of this, a prudent bacon processor will be certain that the average processed belly weight will be well enough below the average raw belly weights so as to comfortably account for variations in bellies and their processing, particularly variations in brine pickup percentage. It will be appreciated that, if the range of fluctuation of the finished weights of the respective bellies is relatively wide, then the average processed belly weight must be lower than if this range of processed belly values were narrower. One could consider the processed belly weights to fluctuate between an upper control limit and a lower control limit of weight values. It is desirable that the upper control limit of the processed bellies be as close as possible to the preinjected raw belly weights Typically, this will involve reducing the difference between the upper control limit and the lower control limit.

Prior art patents such as Townsend U.S. Pat. Nos. 3,863,556 and 4,220,669 suggest devices for varying the amount of brine injection into a meat product or the like, with the extent of such brine injection being controlled somewhat by the make-up of the product. U.S. Pat. No. 3,863,556 describes a machine for injecting pickling brines into pork bellies through the use of needles passing through a stripper plate. The stripper plate engages the top surface of the belly in order to measure the thickness of the belly, and an attempt is made to measure average thickness by permitting the plate to be higher at one end of the pork belly than at its other end. U.S. Pat. No. 4,220,669 shows a plurality of stripper plates, and this patent indicates that it controls the volume of brine administered by controlling the flow of fluid injected through the needles at a rate that is proportional to the movement velocity of the needles.

The present invention advances this art by varying the injection of brine or the like whereby the brine injection is carried out in a manner such that uniformity of injection throughout the belly is enhanced. In addition, the brine pickup percentage is more closely controlled to be more uniform from belly to belly by proceeding with an injection arrangement that allows each belly to be monitored at a location upstream of the injector, and to have data collected during the monitoring operation input to the brine injection mechanism in accordance with a pattern that will best inject that previously monitored belly. The system permits the needed adjustments to be made "on the fly" and while the bellies are proceeding to and through the injection mechanism.

In summary, the present invention is directed to an automatic system, including an apparatus and method, for injecting brine and the like into food items, particularly meat components including bellies for making bacon products. A series of meat items or the like are conveyed to, through and out of an injection assembly having one or more injectors that move into and enter each meat item for injecting a fluid such as a brine composition thereinto. The injector is preferably of the type in which respective increments of the brine are ejected therefrom at various velocity values which vary generally along the stroke length of the injector between a maximum value and a minimum value. The increment of fluid which is ejected at each various velocity value is varied according to a parameter such as thickness of the belly or the like. In this way, the amount of brine injected into each belly is tailored according to the parameter, with the result that the brine pickup percentage is more uniform from belly to belly processed according to the invention.

It is a general object of the present invention to provide an improved apparatus and method for injecting brine and the like into meat items such as bacon bellies.

Another object of the present invention is to provide an improved apparatus and method for automatically injecting an optimum quantity of fluid such as brine composition into each one of a flow of items such as raw bacon bellies.

Another object of this invention is to provide an improved apparatus and method for varying brine pickup from belly to belly such that the upper control limit of the range of belly processed weights closely approaches the raw belly weights.

Another object of this invention is to provide an improved system wherein a parameter of a flow of individual bellies is measured in order to generate data for control of brine pickup injected into the flow of bacon bellies.

Another object of the present invention is to provide an apparatus and method whereby, during brine injection of bacon bellies, bellies of a given weight will be injected with different quantities of brine, depending upon belly thickness.

Another object of the present invention is to provide an improved belly injection system wherein injection values are varied by changing the time at which the brine volume is ejected along the stroke of a reciprocating injector.

Another object of this invention is to provide an improved apparatus and method for enhancing bacon product uniformity in terms of texture, color, cure, taste and the like.

Another object of the invention is to provide an improved system wherein a bacon belly can be automatically injected with brine in proportion to its size and to have a generally uniform moisture content generally throughout its cross-sections.

Another object of this invention is to provide an improved apparatus and method for tailoring brine injection patterns, including varying the amounts of brine injected at different injection velocities along the length of a needle injector or the like.

Another object of this invention is to provide an improved apparatus and method for injecting bacon bellies and the like with brine compositions and the like wherein the amount injected is substantially uniform throughout each belly and from belly to belly.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 3 is an end elevational view of the assembly illustrated in FIG. 2;

FIG. 4 is a top plan view, partially broken away, of a portion of the injection assembly illustrated in FIGS. 2 and 3;

FIG. 6 is an elevational view of a downstream portion of the illustrated injector assembly, showing an excess brine removal arrangement.

FIG. 7 is a side elevational view of an assembly for preconditioning and for monitoring the thickness parameter of bellies or the like passing therethrough;

FIG. 8 is an end elevational view of the assembly illustrated in FIG. 7; and

FIG. 9 is a somewhat schematic illustration of an injection arrangement suitable for use in accordance with the invention.

DESCRIPTION OF THE PARTICULAR EMBODIMENTS

Figure 1:
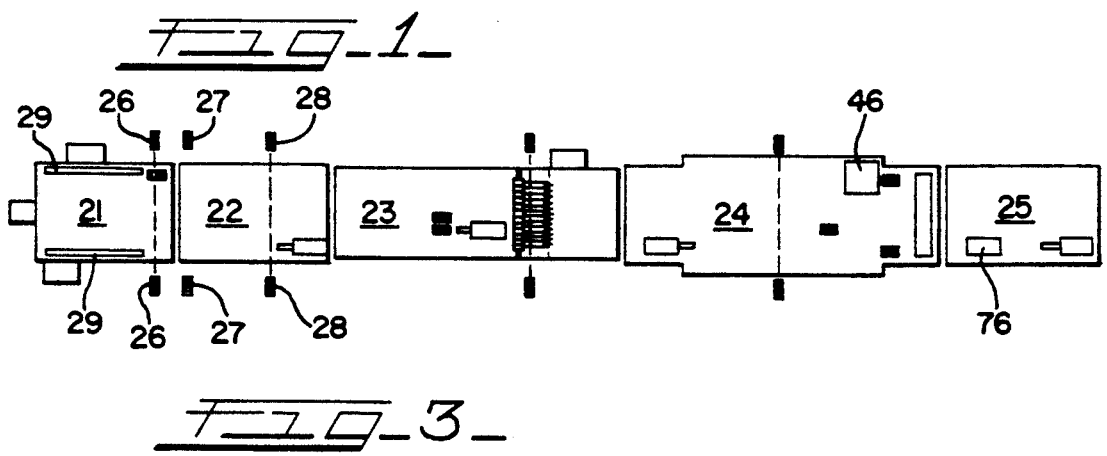
FIG. 1 is a generally schematic top plan view of a portion of a bacon belly processing line which incorporates the present invention.

A portion of a bacon processing line incorporating the present invention is illustrated in FIG. 1. Included are a load conveyor 21, an upstream weigh conveyor 22, a dimension grading station 23, an injection station 24, and a downstream weigh conveyor 25. Load conveyor 21 provides a feed mechanism for the weigh conveyor 22, after which the bellies or the like move to the dimension grading station 23 for measurement of a parameter of each belly or the like. This parameter is then transmitted to the device for controlling the injection station 24 so that amount of brine or the like which is injected thereat is tailored to the particular belly which had passed through the dimension grader assembly 23. After preferred removal of excess brine or the like, each belly or the like is weighed on the downstream weigh conveyor 25

Concerning the load conveyor 21, it is of a generally known construction and functions in order to provide proper spacing of the bellies or the like for feeding onto the weigh conveyor 22. Preferably, a photoelectric sensor source and receiver pair 26 are movable generally along the length of the unit in order to vary the location at which an upstream belly passing thereby signals the load conveyor 21 to move the next belly onto the upstream weigh conveyor 22. If desired, guides 29 which can be moved into and out of position can be provided along the load conveyor 21 to enhance the feeding operation. Two pairs of spaced photoelectric sensors 27 and 28 are provided in connection with the weigh conveyor 22, which is of a generally known construction whereby weighing is conducted while the full belly is on the weigh conveyor 22. Downstream weigh conveyor 25 is of a similar construction, except typically the conveyor belting thereof will be designed to readily allow a brine solution or the like to pass therethrough in order to aid in draining external fluids off of the injected belly or the like. The upstream weigh conveyor 22 is provided to record the pre-injected weight, while the downstream weigh conveyor 25 monitors the injected weight in order to permit calculation of the brine pickup percentage for each injected belly or the like. The downstream weigh conveyor 25 also includes suitable brine collecting pans or the like in order to collect and recirculate the run-off brine to the injection station 24.

Details of a dimension grading station 23 of the type that is suitable for use in accordance with the present invention are illustrated in FIGS. 7 and 8. This assembly preconditions the bellies or the like and it also measures the thickness or height of each individual belly passing from the upstream weigh conveyor 22 to the injection station 24. A preconditioning assembly 31 is illustrated as including conditioning wheels 32 for engaging and generally flattening each belly or the like at a location which closely precedes the location at which the thickness readings are taken. Preferably, the conveyor belt 33 is of a type which includes a plurality of raised elements (not shown) on the top surface thereof in order to enhance frictional engagement between the belt 33 and bellies or the like passing thereover.

With more particular reference to the thickness-reading mechanism, a plurality of fingers 34 are mounted from a cam assembly 35 secured to a supporting shaft 36 which is mounted to the frame of the dimension grading station 23, typically at a position above the conveyor belt 33 by a suitable plate assembly 37. Also included in this mechanism is a cam shaft 38 positioned between supports 39.

A case 50 having photoelectric sensors is positioned in the proximity of the free ends of the fingers 34 in order to signal that a belly or the like is present thereat so that readings can begin. The readings occur when each finger 34 independently moves generally upwardly in response to engagement by a portion of the belly or the like passing along the conveyor 33. As each finger 34 moves up and down, its cam 35 moves accordingly and engages an electromicrometer 41 of generally known construction. Each electromicrometer 41 measures the distance by which it is moved by its corresponding cam 35 and converts same to an electronic signal. The electronic signals emanating from each electromicrometer 31 are then used to calculate an average height or thickness of the particular belly passing under the fingers 34. Maximum and minimum thickness values can also be noted. At least the average height data are then utilized in controlling an injector assembly of the injection station 24.

Details of the illustrated injection station 24 are found in FIGS. 2 through 6 and 9. Suitable detectors 42 signal when a belly or the like passes thereby in order to signal that a belly is coming. A suitable time delay or other arrangement can be used to thereby designate when injection is to be initiated. An injector assembly, generally designated as 43, is positioned along, and typically above a conveyor 44, which is preferably made of a material that will withstand constant and vigorous thrusting from the injector assembly 43 onto the bellies or the like 45 which are supported by the conveyor 44 as the bellies or the like move through the injection station 24. A supply tank 46 provides a quantity of brine solution or other fluid to be injected into the belly 45 or the like by the injector assembly 43.

The illustrated injector assembly 43 includes a plurality of needle injectors 47 for entry into the belly 45 or the like and for injection of the fluid through a plurality of ports 53 (FIG. 9) that are oriented generally radially and are positioned near the distal end of each needle 47. An eccentric shaft assembly 48 and rod 49 control movement of the various needle injectors 47 such that the injectors 47 rapidly reciprocate between fluid injection and needle withdrawal.

The general operation of the injector assembly 43 is schematically illustrated in FIG. 9 in which the push-and-pull rod 49 is shown at 90° past top dead center during rotation of its eccentric shaft assembly 48. When the top dead center condition is presented, a piston component 51 is fully extended out of a cylinder component 52 of the needle injectors 47, and the cylinder component 52 can be filled with the fluid to be ejected. When the bottom dead center condition is presented, the piston component 51 is fully inserted into the cylinder 52, at which time fluid ejection has been substantially completed. It will be appreciated that, as the eccentric shaft assembly 48 rotates, the gang of needle injectors 47 move generally up and down, corresponding to a movement out of and into each belly 45 or the like.

Fluid from the supply tank 46 is pumped into the cylinder components 52 of the injector assembly 43 by suitable pumping arrangements. In the preferred embodiment of the present invention which is illustrated herein, the timing of the fluid flow into the cylinder components 52 is important to the tailored injection carried out on each individual belly. The specific embodiment which is preferred for achieving this varying of incremental fluid ejection from ports 53 of each needle injector 47 will now be described in some detail. It will be appreciated that other means not specifically disclosed herein could instead be utilized in order to achieve the fluid injection tailoring result of the present invention.

In the illustrated embodiment, a primary pump 54 and a secondary pump 55 control the flow of fluid out of the supply tank 46. Suitable feed lines 56 and 57 flow into each cylinder component 52. Each pump 54 and 55 is driven independently by a driven rod assembly described in greater detail hereinafter. The pump control assemblies are provided so that the individual pumps 54 and 55 are driven independently and typically out of phase with each other. At least one of the pump driving assemblies is automatically responsive to belly parameter information which had been previously collected for the particular belly being injected. The illustrated parameter is the average belly thickness determined at the dimension grading station 23 described herein or by some other suitable means.

Again in the illustrated embodiment, it is the secondary pump 55 which is automatically adjusted so as to vary the pumping phase thereof with respect to a fixed pumping phase of the primary pump 54. Generally speaking, the secondary pump can be thought of as a booster pump which operates with timing adjustability depending upon the particular needs of each belly or the like. It can be desirable for this secondary pump to have a bore different from, such as smaller than, the primary pump.

A somewhat schematic illustration of the preferred embodiment is provided in FIG. 9. Included are a primary shaft eccentric assembly 58 and a secondary shaft eccentric assembly 59. A primary push rod 61 directly connects the eccentric assembly 58 with the primary pump 54, and a secondary push rod 62 directly connects the eccentric assembly 59 with the secondary pump 55. At the respective orientations illustrated in FIG. 9, the primary pump and secondary pump are 90° out of phase with each other. The driving arrangement of the primary pump which is depicted is midway between top dead center and bottom dead center, while the drive arrangement for the secondary pump is shown at bottom dead center. As illustrated, the primary pump already has delivered its full volume into the cylinder components 52, and it is in the process of filling itself for pumping action during the next cycle. The secondary pump is shown as fully filled with fluid and poised to pump its contents into the cylinder components 52. At the same time, the eccentric shaft assembly 48 is shown midway between top dead center and bottom dead center, and its rod 49 has emptied the cylinder components 52 to about one half of capacity. Fluid can be seen exiting from the ports 53 and into a belly 45 or the like.

Each of the primary and secondary shaft eccentric assemblies 58 and 59 rotate at the same speed so that a complete revolution of each of them requires the same amount of time. In their respective orientations illustrated in FIG. 9, the secondary pump 55 will next deliver its load in order to add to the load already delivered by the primary pump 54 into the cylinder components 52. This provides an addition of fluid that boosts the injection out of the ports 53 beginning with the injection location which is illustrated in that Figure, namely the approximate midpoint location. The total volume of fluid ejected by the combined pumps can be the same regardless of the phase relationship between the pumps.

With the structure of the injector assembly 43 which is illustrated, the velocity of fluid delivery out of the ports 53 varies with the location of the piston component 51 within the cylinder component 52. When the eccentric shaft assembly 48 is at top dead center, the velocity is zero, and it is likewise zero at bottom dead center. From the top dead center location to the middle dead center location illustrated in FIG. 9, the velocity accelerates up to the maximum velocity achieved at the mid-point of the stroke. Thereafter, deceleration is experienced from the mid-point of the stroke until the stroke is completed when the bottom dead center condition is achieved. Varying the phase relationship between the pumps adjusts the height along the delivery stroke of the needle injectors 47 at which delivery of the load from the secondary pump is initiated. This means that, with an orientation such as that illustrated in FIG. 9, the initial input from the secondary pump 55 will result in an ejection from the ports 53 of additional fluid at the midpoint orientation shown in FIG. 9.

If one modifies the orientation shown in FIG. 9 by varying the phase relationship between the eccentrics 58 and 59, the fluid added into the system by the secondary pump 55 will be added at a different time within the cycle. For example, if the secondary pump fluid is added at a time earlier than that illustrated in FIG. 9, the initial velocity of the resulting fluid exiting from the ports 53 will be less than that when the orientation of FIG. 9 is provided. This is because the injector assembly 43, when the secondary pump is activated, has not as yet accelerated to its maximum velocity. By the same token, if the phase relationship between the primary eccentric 58 and the secondary eccentric 59 is modified such that the secondary pump adds its delivery volume to the system at a time later than that shown in FIG. 9, the delivery velocity out of the ports 53 will likewise be less than the maximum velocity attained with the FIG. 9 orientation. This is because the injector assembly 43 will have moved past the mid-point orientation shown in FIG. 9, or it will be decelerating, with the result that the delivery velocity out of the ports 53 at the time the secondary pump delivers its volume will have decelerated to a velocity less than its maximum velocity.

A better understanding of the significance of this relationship will be gained by a more detailed consideration of a preferred embodiment wherein a plurality of conveyed bacon bellies 45 are injected with a brine solution passing from the supply tank 46 to the ports 53. Again referring to the orientation and the schematic illustration of FIG. 9, the stroke length of the reciprocating injector assembly 43 is approximately 4.5 inches. The illustrated belly is one having an average height or thickness of approximately 2.25 inches, which is a relatively thick belly. Some of the brine will be ejected before the needles 47 enter the belly. This excess brine will run off and be collected in pans 40 or the like for eventual recirculation to the supply tank 46. Excess brine can be confined within the area of the needle injectors by suitable swinging doors (not shown) horizontally mounted above the surface of the conveyor 44.

The brine being injected into the belly according to the FIG. 9 illustration will be injected at substantially maximum velocity and greatest rate of pumping volume in the top portion of the belly, with the velocity decelerating to zero near the bottom of the belly 45. If the belly 45 were thinner, the maximum ejection velocity would occur before the needle injectors 47 enter the belly, with the result that the maximum belly injection velocity for a thin belly would be lower than that for thick belly with the relative pump phase arrangement that is depicted in FIG. 9.

Injection velocity, generally speaking, determines the extent to which the brine is laterally distributed through the radially oriented ports 53 when the needle ejectors 47 are within the belly 45. The greater the pressure of the brine exiting the ports 53, the greater will be the penetration of the brine into the belly.

It has been determined that the brine pickup by a given belly will be tailored to more closely achieve the target pickup in each belly by varying this phase relationship between the primary pump 54 and the secondary pump 55. The upper control limit of the average weight of a fully processed belly can be made to be much closer to the raw belly weights when this phase relationship is varied depending upon the average thickness of each belly. Generally speaking, it is believed to be desirable to have the amount of phase delay of the secondary pump 55 with respect to the primary pump 54 to be greater for thinner bellies than for the thicker bellies. By having the secondary pump 55 incorporate its added brine volume into the system at a later time than, say after the middle orientation of the injector assembly 43 which is shown in FIG. 9, more fluid will be ejected from the ports 53 at a time when the ports 53 are within the thinner belly in order to thereby inject more brine within the belly. If the thin belly and the thick belly were of a similar weight, and all other things were equal, without the phase adjustment discussed herein, more brine would be injected into the thick belly than into the thin belly. In this instance, the brine pickup percentage for the thick belly would be greater than the brine pickup percentage for the thin belly, causing an undesirable variation in brine pickup between these two bellies.

With more particular reference to the specific mechanism illustrated herein for achieving the phase adjustment characteristic, the primary shaft eccentric assembly 58 is driven at a substantially constant speed by a motor 63 or the like. The primary shaft eccentric assembly 58 is secured to an output shaft 64 of the motor 63. This directly drives the primary pump 54. Output from the motor 63 is also transmitted by means of a roller chain 65 or the like to a phase changer assembly 66 by conventional means. Output from the phase changer assembly 66 from its output shaft 67 is transmitted to sprocket 68 or the like by suitable means such as a roller chain 69. Suitable mounting means such as the pillow block assemblies 71 can be provided for supporting and driving the secondary shaft eccentric assembly 59. Sensors or detector 72, 73 preferably are provided to detect the actual position of each crankshaft of the respective primary shaft and secondary shaft eccentric assemblies 58, 59.

Referring more specifically to the phase changer assembly 66, this drives the crankshaft of the secondary pump assembly at a phase either ahead of or behind the crankshaft of the primary pump assembly. The extent and direction of this phase change carried out by the assembly 66 is controlled by a servomotor 74 connected to the phase changer assembly 66 by a surtable shaft 75. The servomotor 74 turns the shaft 75 either clockwise or counterclockwise, thereby changing the phase relationship between the primary and secondary pumps. This change in phase, as previously discussed, ultimately determines the brine pickup percentage for the particular belly thus injected.

The servomotor 74 is, through a suitable control assembly 76, linked to a supply of data that includes information regarding at least one parameter of the belly or the like which is to be injected by the injector assembly 43. In the illustrated embodiment, the input to the control assembly 76 is the belly thickness data that is obtained from the dimension grading station 23. The control assembly 76 is of generally conventional overall construction and includes a look-up table containing a plurality of belly thickness values, each of which corresponds to an address. Each address contains an encoder value which directly relates to the number of degrees of difference between the primary and secondary pumps. The servomotor 74 thus is instructed to run until a specific encoder value is attained in order to thereby determine the phase difference between the primary and secondary pumps. This servomotor control occurs continually, with the result that the phase difference is adjusted "on the fly" while a belly or the like is being injected.

The control assembly 76 can also include means for calculating the brine pickup percentage. The weight of each raw belly which was determined on the upstream weigh conveyor 22 and the weight of that belly determined by the downstream weigh conveyor 25 are compared, with the difference in weight between the injected belly and the raw belly representing the weight of brine pickup. From these data, the brine pickup percentage for each belly can be calculated. If this brine pickup percentage is within the target range between the upper control limit and the lower control limit, the data can be stored or displayed as desired. In the event that the brine percentage pickup is beyond the target range by being either too great or too small, this can be signalled as desired. Preferably, the data collected, especially data showing injection above or below the desired pickup limits, can be used to adjust the encoder values in the look-up table. This adjustment of encoder values can be carried out in any desired manner, whether manually or automatically by a computer operating with appropriate logic to complete the control loop. In either event, by utilizing the control loop feature, the data in the look-up table is constantly being refined and corrected so as to further minimize undesirable variation in the injection procedure carried out according to the invention.

Figure 2:
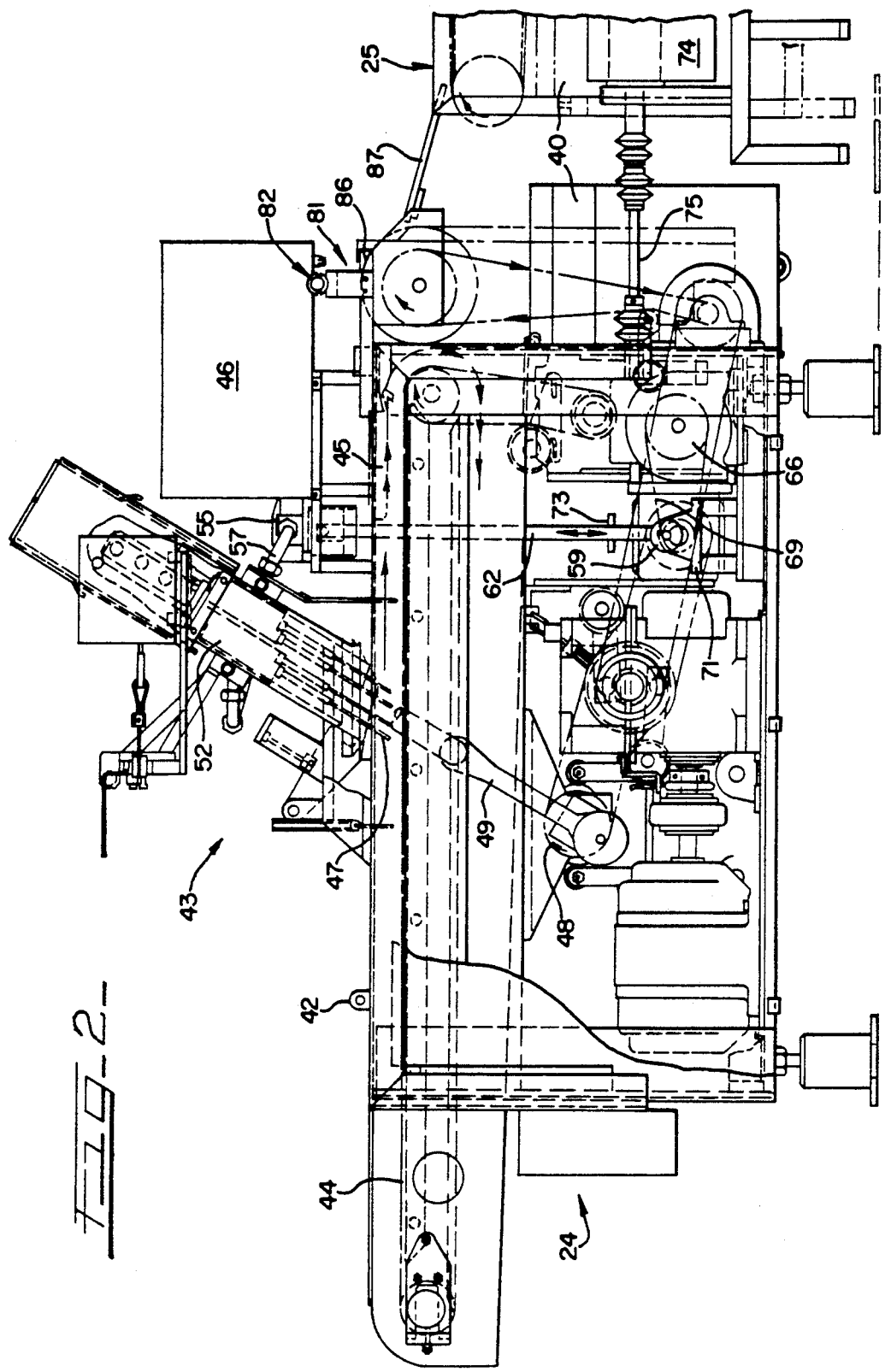
FIG. 2 is a side elevational view of a preferred injection assembly suitable for injecting brine composition into bacon bellies.
Figure 5:
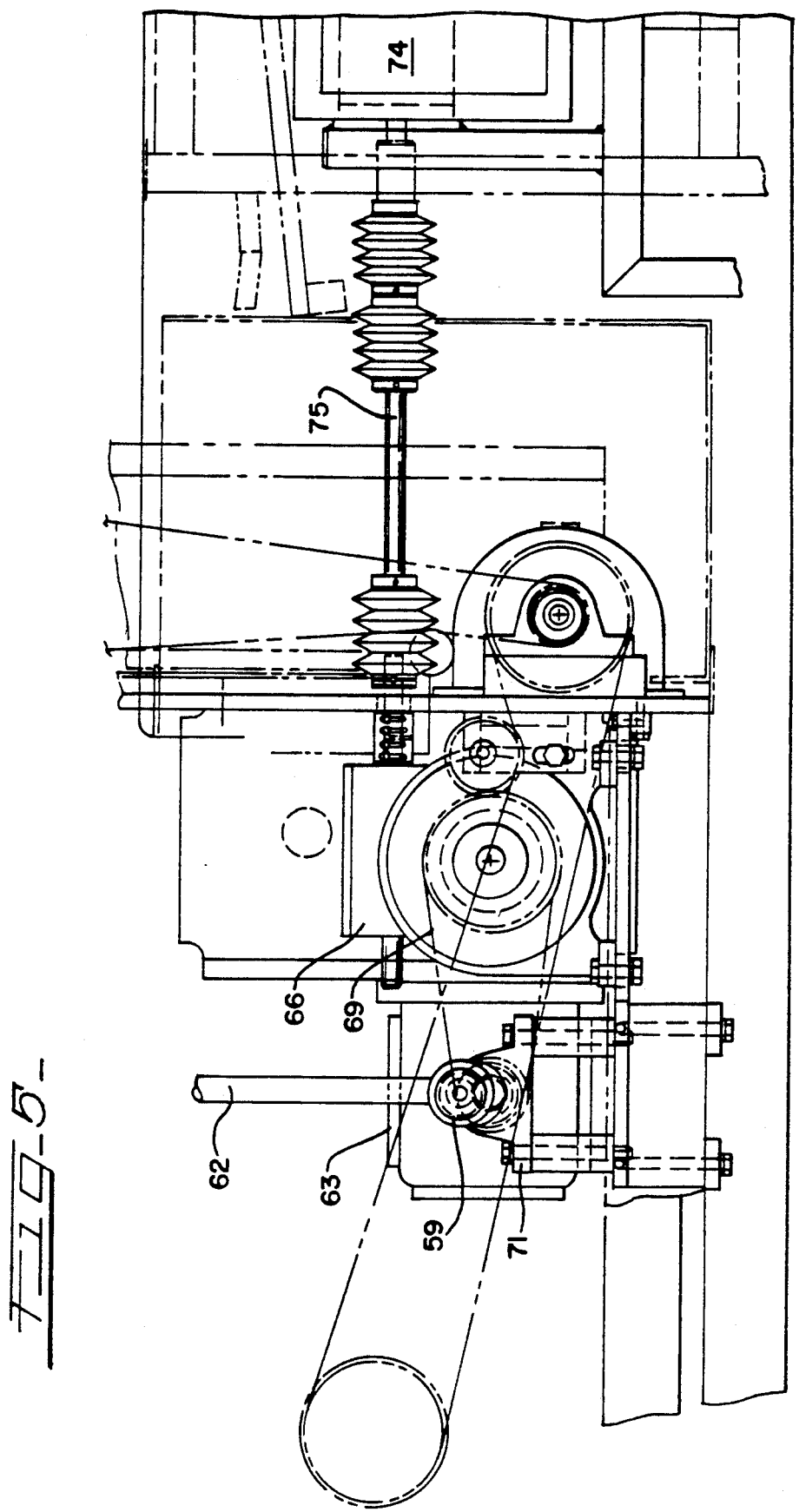
FIG. 5 is a side elevational view of a portion of the injection assembly of FIG. 4.

After injection has been completed, the belly 45 or the like is conveyed off of the injection station 24. It will be appreciated that the belly will have a quantity of brine lying on its surface after the injection procedure has been completed. Inasmuch as the next stage in the preferred illustrated arrangement is passage to the downstream weigh conveyor 25, it is desirable to remove as much of the surface brine as possible prior to the weighing of the injected belly in order to avoid the weighing of brine which is not part of the brine pickup because it is only temporarily on the belly. In order to remove this surface brine, a surface fluid removal assembly, generally designated as 81 in FIGS. 2 and 6, is provided. An air flow assembly, generally designated as 82, blows excess fluid such as brine off of the top of the product or belly for collection in the pans 40 and recirculation as desired. Included are a suitable mounting bracket 83, a wand 84 and a plurality of nozzles 85.

With this structure, an air squeegee type of arrangement is provided wherein pressurized air blows excess fluid off the surface of the product. This air squeegee effect preferably is enhanced by also including a raised conveyed surface, such as the illustrated sprocket wheel 86, at a location which is preferably slightly downstream of the impingement of the air squeegee flow onto the product such as the illustrated belly 45. This facilitates the flow of brine or the like off of the belly or the like, after which the thus drained belly or the like is conveyed onto a suitable transfer member 87. It has been found that the surface fluid removal assembly 81 effectively eliminates what could otherwise be a drain time of approximately 30 seconds per belly.

While particular embodiments of the invention have been described, it will be apparent to those skilled in the art that various modifications thereof may be made without departing from the true spirit and scope of the invention. Accordingly, it is intended by the appended claims to cover all such modifications and equivalents which embody the inventive features as defined in the claims.

We claim:

1. An apparatus for injecting a fluid into a conveyed flow of a plurality of items, comprising:
   a framework assembly;
   conveying means secured to said framework assembly for supporting and conveying a series of items to be injected;
   injecting means positioned along said conveying means, said injecting means being for engaging each item which is conveyed thereto by said conveying means with an injector that moves toward and enters into each item and that injects a fluid into the item, said injector having a preselected stroke length;

said injector including means for ejecting respective increments of the fluid at various velocity values which vary generally at locations along said stroke length between a maximum velocity value and a minimum velocity value;

means for varying the timing of incremental fluid delivery to said ejecting means whereby the flow of fluid ejected thereby is tailored to each said item; and control means for controlling said varying means and for determining said flow of fluid for each of the respective items in response to data input thereto corresponding to a parameter of the item being injected.

2. The apparatus according to claim 1, wherein said varying means provides for ejecting a portion of said fluid at a location along said stroke length which is external of said item.

3. The apparatus according to claim 1, wherein said ejecting means and said varying means cooperate to tailor for each item the respective volumes of fluid ejected at incremental locations along said stroke length.

4. The apparatus according to claim 3, wherein each of said incremental volumes of fluid ejected at incremental locations along said stroke length are ejected at a velocity corresponding to its location along the stroke length.

5. The apparatus according to claim 1, wherein said stroke length of the ejecting means has an approximate midpoint location and an approximate endpoint location, and wherein said maximum velocity value occurs at said approximate midpoint location and said minimum velocity value occurs at said approximate endpoint location.

6. The apparatus according to claim 1, further including dimension grading means for generating the parameter data input to the control means, said dimension grading means being at a location upstream of said injecting means.

7. The apparatus according to claim 6, wherein said dimension grading means determines a thickness parameter of each said item.

8. The apparatus according to claim 6, further including preconditioning means for engaging and generally flattening the items, said preconditioning means being at a location closely upstream of said dimension grading means.

9. The apparatus according to claim 6, wherein said dimension grading means includes a plurality of fingers for engaging each item and for transmitting a signal to said control means that corresponds to movement of the fingers.

10. The apparatus according to claim 1, wherein said varying means includes a primary pump and a secondary pump for moving the fluid between a fluid supply source and said ejecting means, each said pump having a discharge mode, and said varying means changes the timing of the discharge mode of at least one of said pumps whereby a phase relationship between the respective discharge modes is varied in order to vary the timing of incremental fluid delivery to the ejecting means.

11. The apparatus according to claim 10, wherein each pump has a pump bore size and wherein the pump bore size of the secondary pump is smaller than the pump bore size of the primary pump.

12. The apparatus according to claim 1, further including surface fluid removal means along said conveying means and downstream of said injecting means, said surface fluid removal means including a curtain of pressurized fluid such as air directed onto each item passing to said surface fluid removal means.

13. The apparatus according to claim 12, wherein said surface fluid removal means further includes a raised conveyed surface over which each item moves while the item is subjected to said curtain of pressurized fluid.

14. An apparatus for injecting a brine solution into a conveyed flow of a plurality of bacon bellies, comprising:

a framework assembly;

conveying means secured to said framework assembly for supporting and conveying a series of bacon bellies to be injected;

injecting means positioned generally above said conveying means, said injecting means being for engaging each belly which is conveyed thereto by said conveying means with a plurality of injectors that move toward and enter into each belly and that inject a brine solution into the belly, each said injector having a preselected stroke length;

said injecting means including means for ejecting respective increments of the brine solution either into or generally above each said belly and at various velocity values which vary generally at locations along said stroke length between a maximum velocity value and a minimum velocity value;

means for varying the timing of incremental brine solution delivery to said ejecting means whereby the flow of fluid ejected thereby is tailored to the thickness of each said bacon belly; and control means for controlling said varying means and for determining said flow of brine solution for each of the respective bellies in response to data input thereto corresponding to a thickness parameter of the belly being injected.

15. The apparatus according to claim 14, wherein said ejecting means and said varying means cooperate to tailor for each belly the respective volumes of brine solution ejected at incremental locations along said stroke length, and wherein each of said incremental volumes of brine solution ejected at incremental locations along said stroke length are ejected at a velocity corresponding to its location along the stroke length.

16. The apparatus according to claim 14, further including dimension grading means for generating the thickness parameter data input to the control means, said dimension grading means being at a location upstream of said injecting means, and further including preconditioning means for engaging and generally flattening the bellies, said preconditioning means being at a location closely upstream of said dimension grading means.

17. The apparatus according to claim 14, wherein said varying means includes a primary pump and a secondary pump for moving the brine solution between a brine solution supply source and said ejecting means, each said pump having a discharge mode, and said varying means changes the timing of the discharge mode of at least one of said pumps whereby a phase relationship between the respective discharge modes is varied in order to vary the timing of incremental brine solution delivery to the ejecting means.

18. The apparatus according to claim 14, further including surface brine solution removal means along said conveying means and downstream of said injecting means, said removal means including a curtain of pressurized air directed onto each belly passing to said removal means.

19. The apparatus according to claim 18, wherein said surface brine solution removal means further includes a raised conveyed surface over which each belly moves while the belly is subjected to said curtain of pressurized air.

20. A method for injecting a fluid into a conveyed flow of a plurality of items, comprising:
  conveying a series of items to be injected with a fluid to form a conveyed flow of items;
  engaging each item of the conveyed flow of items with an injector and injecting a fluid into the item during at least a portion of the stroke length of the injector at which the injector ejects the fluid;
  ejecting respective increments of the fluid at various velocity values which vary generally along the stroke length between a maximum velocity value and a minimum velocity value;
  varying the timing of incremental fluid delivery to the injector to tailor the flow of fluid ejected thereby to each said item; and
  receiving parameter data for each of said items and utilizing said parameter data for controlling said timing of incremental fluid delivery to each of said items.

21. The method according to claim 20, wherein said ejecting step injects a portion of said fluid into each of said items and ejects another portion of said fluid at a location external of said items.

22. The method according to claim 20, wherein the ejecting and varying steps cooperate to tailor incremental volumes of fluid ejected at the various velocity values.

23. The method according to claim 20, further including generating said parameter data by monitoring each said item at a location upstream of said injector.

24. The method according to claim 20, further including removing ejected fluid from the surface of each said item, said removing step being at a location downstream of said injector, said removing step including directing pressurized fluid such as air onto the surface of said item while conveying said item along a raised surface.

25. The method according to claim 20, wherein said items are bacon bellies, said fluid is a brine solution, and said parameter data are belly thickness data.

* * * * *

UNITED STATES PATENT AND TRADEMARK OFFICE
CERTIFICATE OF CORRECTION

PATENT NO. : 5,071,666
DATED      : December 10, 1991
INVENTOR(S) : Gary A. Handel, Timothy G. Mally and Larry G. McManis, Jr.

It is certified that error appears in the above-indentified patent and that said Letters Patent is hereby corrected as shown below:

Title page, item [56],

In References Cited, the line reading "3,347,679  10/1967  Nordin" should
    read --3,347,679  10/1967  Nordin ... 99/107--.
Col. 4, line 48, "that amount" should read --that that amount--;
    line 53, "conveyer 25" should read --conveyor 25.--.
Col. 7, line 40, "illustrated. the" should read --illustrated, the--.
Col. 9, line 32, "surtable" should be --suitable--.
Col. 11, line 59, "pply" should read --supply--.

Signed and Sealed this

First Day of November, 1994

Attest:

BRUCE LEHMAN

Attesting Officer          Commissioner of Patents and Trademarks